United States Patent [19]

Savage et al.

[11] Patent Number: 5,114,738

[45] Date of Patent: May 19, 1992

[54] DIRECT OPTICAL FIBER GLASS FORMATION TECHNIQUES USING CHEMICALLY AND/OR PHYSICALLY REMOVABLE FILAMENTARY SUBSTRATES

[75] Inventors: Robert O. Savage, Neptune; Robert J. Fischer; Sam Divita, both of West Long Branch, all of N.J.

[73] Assignee: The United States of America as represented by the Secretary of the Army, Washington, D.C.

[21] Appl. No.: 555,220

[22] Filed: Jul. 20, 1990

[51] Int. Cl.$^5$ .................. B05D 3/06; B05D 3/02; B05D 5/06; B05B 22/500

[52] U.S. Cl. ..................... 427/37; 427/35; 427/45.1; 427/53.1; 427/163; 427/166; 427/167; 427/39

[58] Field of Search ............ 427/37, 38, 39, 45.1, 427/49, 53.1, 163, 166, 167, 35

[56] References Cited

U.S. PATENT DOCUMENTS

| | | | |
|---|---|---|---|
| 3,957,474 | 5/1976 | Kobayashi et al. | 427/53.1 |
| 4,249,925 | 2/1981 | Kawashima et al. | 427/163 |
| 4,306,897 | 12/1981 | Maklad | 427/45.1 |
| 4,376,803 | 3/1983 | Katzman | 427/57 |
| 4,402,993 | 9/1983 | Aisenberg et al. | 427/39 |
| 4,410,567 | 10/1983 | France et al. | 427/163 |
| 4,545,646 | 10/1985 | Chern et al. | 427/53.1 |
| 4,812,150 | 3/1989 | Scott | 427/163 |
| 4,848,998 | 7/1989 | Snitzer et al. | 427/163 |
| 4,874,222 | 10/1989 | Vacha et al. | 427/163 |
| 4,911,742 | 3/1990 | Newbould et al. | 427/163 |

*Primary Examiner*—Shrive Beck
*Assistant Examiner*—Marianne L. Padgett
*Attorney, Agent, or Firm*—Michael Zelenka; William H. Anderson

[57] ABSTRACT

An optical fiber is formed by continuously coating a precursor core filament with a glass-forming coating. The precursor filament is continuously moved from a storage reel through a stationary coating station. The filament is then moved through a stationary glass-forming station and is continuously processed to convert the coating to a glass, with the core either removed from the fiber during glass forming or becoming an integral part of the ultimate fiber during glass forming. The glass fiber is then moved continuously through a glass densification station and is densified in a continuous process. The fiber is thereafter provided with a protective coating as it moves through a stationary coating station and the completed optical fiber is continuously reeled.

30 Claims, 2 Drawing Sheets

DIRECT OPTICAL FIBER GLASS FORMATION TECHNIQUES USING CHEMICALLY AND/OR PHYSICALLY REMOVABLE FILAMENTARY SUBSTRATES

GOVERNMENT INTEREST

The invention described herein may be manufactured, used and licensed by or for the Government for Governmental purposes without payment to us of any royalties thereon.

BACKGROUND OF THE INVENTION

This invention relates to a process for the manufacture of optical glass fiber, and more specifically relates to a novel process in which glass precursor coatings are formed on a continuously moving filamentary core of material which is removed from or becomes an integral part of the ultimately formed optical fiber.

Optical glass fiber is commonly used as the radiation conductor of optical communication or signal-processing systems. Known processes for manufacture of optical fibers employ a thick optical perform rod which may be manufactured as disclosed in U.S. Pat. No. 4,217,027. In this patent, a film of glass-forming material is deposited on the interior of a glass cylinder which is rotated in a glass lathe. The glass cylinder is then collapsed into a short, thick rod or preform which is about ½ inch thick and several feet long. The preform is then drawn into an elongated thin filament of a single or a graded index of refraction across its thickness.

Such preforms require complicated processing steps and repeated batch-type handling and increase the cost of the ultimate fiber. Thus, the preform may constitute 75% of the cost of the fiber. Furthermore, since fiber is drawn from a rod of given volume, the length of the fiber which can be drawn is limited. This increases the number of optical couplers and amplifiers needed to connect a number of relatively short segments into a very long signal path.

BRIEF DESCRIPTION OF THE PRESENT INVENTION

The present invention provides a novel process for the production of high quality glass fiber in extremely long lengths and by a continuous, rather than batch-type, process.

More specifically, in accordance with the invention, a continuous process is provided in which a core filament of extremely long length is moved continuously past a plurality of process steps stations. An early station is a coating station at which the core filament is coated with one or more shells of a glass-forming coating of given index or indices of refraction. The core filament may then be processed to be chemically or physically removed or, alternatively, can become an integral component of the fiber. The coating is then densified to form the ultimate optical fiber. The continuously moving fiber is then coated with a protective coating and reeled on a storage reel. The only limitation on fiber length is the reel capacity and the precursor core length. The precursor core length can be as desired since it is susceptible of being supplied from a continuously operating extrusion source.

Since the process of the invention builds the fiber on a continuously moving precursor which may have any desired length, the completed optical fiber may have the same unrestricted length. Thus, the fiber cost will be substantially reduced and the fiber will have excellent optical quality and high mechanical strength.

Two approaches have been used for making optical fibers from a sol-gel process. The first involves the controlled hydrolysis of metal alkoxides, either for direct fiber drawing (short lengths) from solution, or for casting porous preforms. The second involves the dispersion of colloidal particles, in one case in an aqueous medium and, in another case, in a non-aqueous medium. For the dispersion technique, the colloidal particles are generally fumed silica but also may be derived from soluble silicates. Both approaches are silica-based.

The fibers are processed so that the precursor materials are as pure as possible, and the fabrication stages introduce no contamination. The fabrication stages comprise mixing the components in solution, gelling the solution, drying or freeze drying and converting the dried gel to glass. A fast drying process or a slow drying process can be used for large pores or for small pores, and for excess water or for deficit water respectively, as desired. Preferably, the resulting dried gels should have uniform, interconnected porosity and little residual organic.

The sol-gel process is a preferred appealing technology for optical fiber fabrication. That is because the sol-gel process, by a combination of chemical reactions, turns a homogeneous solution of metal alkoxides, water and solvent, into an infinite molecular weight oxide polymer, which forms a two-dimensional skeleton surrounding interconnected pores. The oxide polymer is isotropic, homogeneous and has a uniform microstructure. The polymer replicates its mold exactly and miniaturizes all features without distortion.

Still another approach to making optical fibers from a sol-gel process, as is described hereinafter involves coating a shell or concentric shells of sol-gel glass on a fiber of graphite or plastic. The carbon host is sacrificed, and the glass shell is collapsed to a fiber. The sol-gel glass shell concept is based on a well known sol-gel film technology.

In the volatile host method, a graphite fiber is dipped into an alkoxide solution and a thin film of liquid adheres to the fiber. Upon exposure to an atmospheric moisture, the film gels. The fiber may be dipped repeatedly to build up a series of films which gel. At this point, the gel is largely converted to oxide, and a rigid, continuous shell runs the length of the fiber.

The second step of the preferred process is drying of the silica shell. Once the shell has hardened, solvent and water must escape through interconnected pores. At the same time the shell is shrinking in the radical dimension, it must remain intact along the axis of the fiber. It is observed consistently that thin films shrink perpendicular to the substrate and not in the plane of the substrate. Likewise, the drying of the shell on the fiber is observed to be anisotropic.

The model for shrinkage considers elimination of hydroxyls, volume relaxation and viscous sintering. In most cases, the gel skeleton is dense at about 300° C., a temperature corresponding to the glass transition of the equivalent melted glass, so that the gel will collapse on itself. Since densification by viscous sintering is only effective at the higher temperatures, a stabilizing heat treatment can be designed which permits volume relaxation, but through isothermal desiccation brings about a substantial increase in viscosity. Once the gel-derived material exhibits a viscosity equivalent to that of the anhydrous glass, little if any densification should occur at temperatures well below the glass transition and the interconnected pore structure remains open until the volatile host is eliminated and the undesirable gases are removed. At the same time, the open porosity can be used to facilitate ion exchange treatments.

The third step is the complete collapse of the shell. It is possible to densify the shell by controlled heating in oxidizing atmospheres followed by vacuum. The ultimate temperature is below the softening temperature for the glass. Therefore, the fiber does not need support during firing. This eliminates sources of contamination or surface abrasion. Nevertheless, the temperature is high enough to permit viscous sintering to full density.

Finally the sol-gel shell which has been converted to dense optical fiber is ready for use as a low loss optical glass fiber in communications systems.

There is no inherent limitation in the sol-gel material that restricts its use in light wave communications. The volatile host method of the invention will produce a high quality optical fiber which competes with commercial fibers produced by chemical vapor deposition processes.

Other features and advantages of the present invention will become apparent from the following description of the invention which refers to the accompanying drawings.

DETAILED DESCRIPTION OF THE INVENTION

Figure 1:
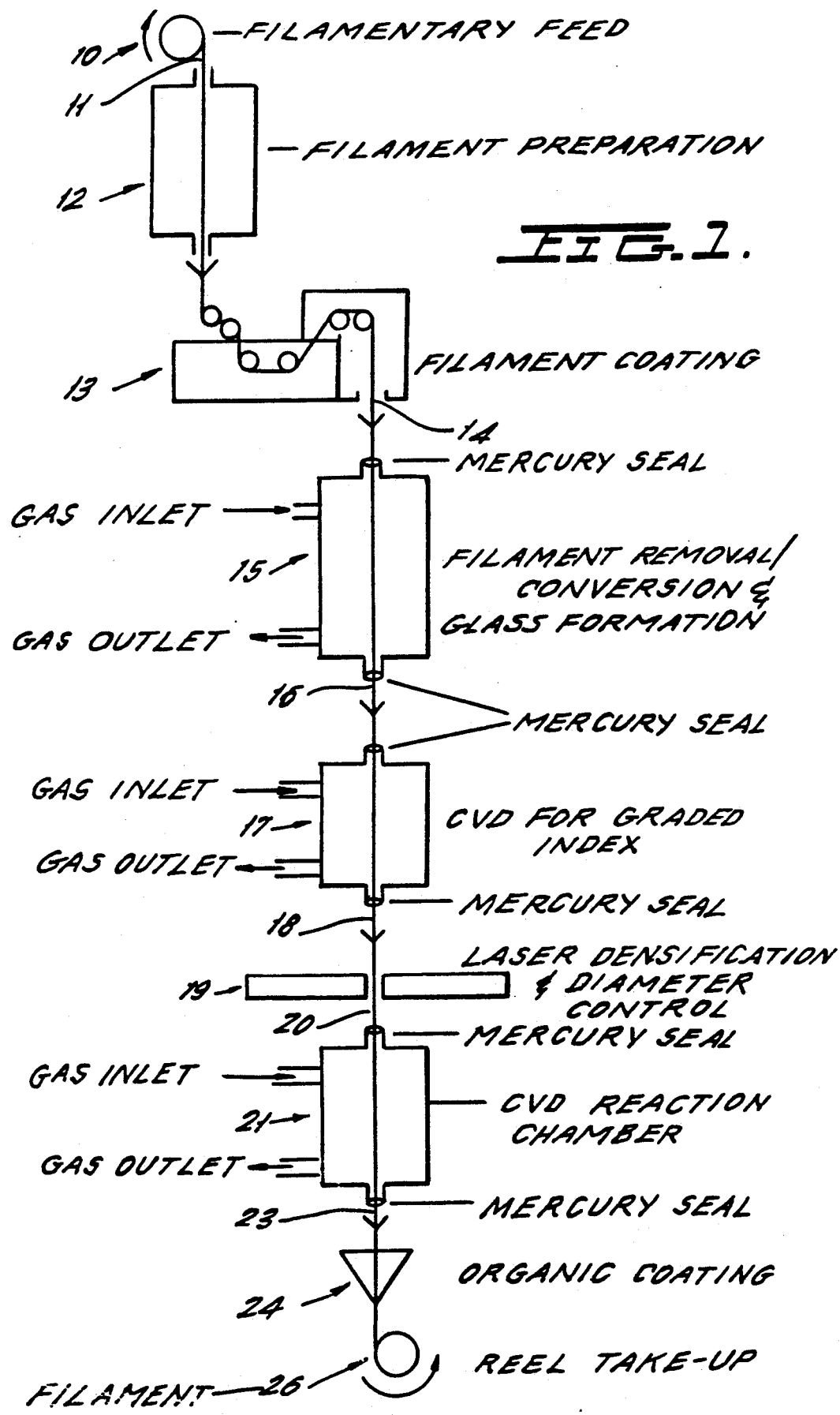
FIG. 1 is a schematic flow diagram of the novel process of the invention.
Figure 2A:
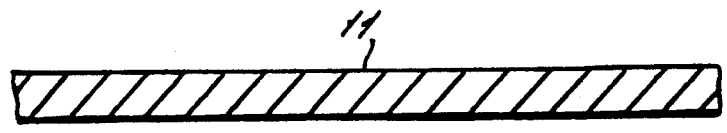
FIGS. 2A, 2B, 2C, 2D, 2E, 2F and 2G show the evolution of the filament as it proceeds through the apparatus.

FIG. 1 schematically shows a reel 10 which is a source for the core filament 11 of FIG. 2A which may have any desired length. A continuous extrusion source can be used in place of reel 10. The filament 11 on reel 10 can be a single filament of carbon or graphite of structure described in U.S. Pat. No. 4,376,803, the disclosure of which is incorporated herein by reference. Carbon or graphite core materials can be volatilized and removed from the ultimately formed fiber as is later described. Other core materials which can be used and of volatilizable type are composed of silicon or a silicon-containing compound such as silicon carbide which will also be later described.

In another embodiment of the invention, fiber optic solid state devices, lasers or amplifiers can be produced through the introduction of compatible dopant ions into the sol-gel silica structure. For example, the fiber can be doped with rare-earth ions (e.g., erbium). The erbium doped sol-gel optical glass coating on a volatile host filament substrate can be vitrified into a dense optical glass fiber optic device such as a fiber laser or a fiber optic amplifier which can be pumped with a semiconductor laser. A one-meter length of such a fiber amplifier could, from calculation, produce a gain of 30 db at a frequency of 10 GHz. Such a device has obvious applications to undersea cables, since both the power required and the number of components are greatly reduced in comparison with conventional electro-optical amplifiers: life and reliability should improve. These relatively short lengths of rare earth doped sol-gel or solution doped fibers, i.e. amplifiers, can be stored in a freeze-dry-dedry freezer for future processing into forms suitable for splicing to a conventional optical glass fiber.

In another embodiment of the invention, the core filament 11 may consist of a material which, rather than being removed from the ultimately formed fiber, becomes an integral part thereof. Thus, a refractory oxide such as alumina ($Al_2O_3$), zirconia ($ZrO_2$) or tantalum pentoxide ($Ta_2O_5$) can be used as the core fiber and becomes an integral part of the final optical fiber.

In still another embodiment of the invention, the core filament can be a material which chemically converts into an integral portion of the final fiber. These core filaments are halide-containing fibers such as $ZrF_4$, $AlF_3$ and $KCl$.

Whichever core material is selected, it may have a diameter of less than 125 microns and may move from reel 10 and through subsequent processing stations at a speed of about 1 meter/second.

As shown in FIG. 1, the precursor core filament 11 from reel 10 first moves to a fixed station 12 which is spaced from reel 10 and at which the surface of filament 11 is prepared to receive a subsequent glass-forming coating. When the core filament is carbon or graphite, prepared as disclosed in previously mentioned U.S. Pat. No. 4,376,803, the core filament will have a polyvinyl alcohol coating. Stage or station 12 in that case constitutes a furnace in which this coating is burned off in an air atmosphere. Alternatively, and for fluorocarbon or carbonaceous fibers in general, station 12 may provide a plasma etch, using oxygen gas or any other reactive plasma medium for the surface treatment as the core filament moves through the station.

Additionally for surface preparation of Halide glasses, gaseous treatment utilizing steam, heated hydrogen and other reactive gases can be used. For refractory oxide filaments, hot halide gases and solutions such as HCl, HF, HI and other reactive gases and solutions can be sequentially applied to the filament surface for surface preparation.

Figure 2B:
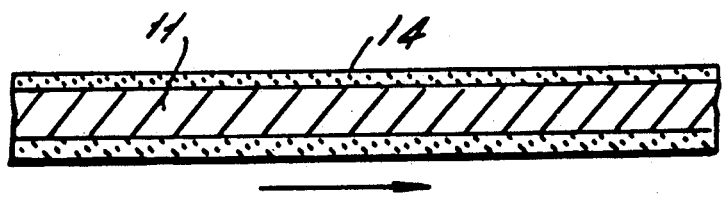

After the surface treatment at station 12, the treated core filament enters station 13 which is spaced from station 12. A glass-forming compound 14, as shown in FIG. 2B, is continuously coated onto the outer surface of the core filament as it moves through station 13.

The coating 14 applied to the core filament is one which can subsequently be converted into optical fiber. Thus, the coating can be tetraethoxysilane (TEOS) in toluene; a high silica-content carbonaceous sol-gel solution; a colloidal silica solution; a hexamethyl siloxane; a silicone solution of any desired nature or a halide-containing sol-gel solution. In general, any composition which converts to an optical fiber can be continuously coated over the entire filament surface as it passes through station 13.

A typical known process for depositing a silicon dioxide ($SiO_2$) coating can consist of a plasma-enhanced decomposition of tetraethoxysilane in oxygen.

Apparatus or stage 13 is so controlled that the precursor coating 14 has a predetermined thickness when the filament leaves stage 13.

The coated filament 14 then enters stage 15 (and leaves it) through an approximate seal such as a mercury seal. Stage 15 is gas filled. The filament core 11 may be continuously removed and the optical glass fiber formed in stage 15. Alternatively the filament core 11 can combine chemically with the coating into an optical glass fiber as shown for filament 16 in FIG. 2C.

In one example, if the filament entering stage 15 is a carbon graphite/filament with a sol-gel coating, stage 15 may consist of an elongated oven containing a hot oxidizing atmosphere, for example, oxygen gas at about 600° C. The carbon/graphite filaments will then be removed by reaction in the oxidizing atmosphere and the carbonaceous content of the sol-gel will also be removed. The coating 14 is converted to a glass coating which is densified in a later process step. The dwell time in stage 15, which depends on its speed and effective oven length, is determined by the reaction time to complete the glass formation process.

As a further example of the processing of stage 15 for a carbon/graphite filament with a sol-gel coating, the stage can contain means to inject a high electric current along the axis of the filament to heat the filament to a temperature of 600° C. to 1400° C. and reduce the core and convert the coating to glass. Alternatively, heating in stage 15 can be created by an electrical arc between spaced electrodes or by passing the filament through an appropriate high energy microwave cavity or R.F. induction furnace. $Cl_2$ or HCl gas atmosphere should be used to remove the water content of the sol-gel.

As another example of stage 15, for the case of a carbon/graphite filament coated with TEOS in a toluene solution, the process disclosed in U.S. Pat. No. 4,376,803 to Katzman may be used for the formation of a silicon dioxide layer, with an added oxidizing process for removal of the carbon/graphite filament.

In a further example of the invention, the precursor core 11 of FIG. 2A may be a fluorocarbon fiber which is coated in station 13 with a glass-forming coating. The same filament removal/conversion and glass formation stage 15 can be used to process this filament, as was used to process the carbon/graphite filament.

Figure 2C:
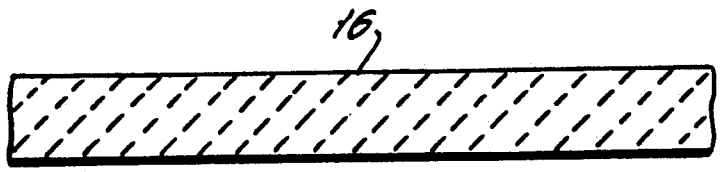

A similar structure can be used for stage 15 to that described above for the treatment therein of alumina/refractory oxide filaments with precursor coatings. The filament core 11 in this example is not removed, but is converted to the glass fiber body as shown in FIG. 2C for converted filament 16. For example, precursor sol-gels will be converted to silica as previously described, with further heat treatment used to cause a reaction between an alumina (or other refractory oxide filament) with the silica to form the precursor fiber 16 to be densified.

The same process used for alumina ($Al_2O_3$) can be used for other refractory oxide filament cores such as zirconia ($ZrO_2$) and tantalum pentoxide ($Ta_2O_5$) and the like, which form the core fiber after the fiberization process.

Stage 15 will also be used for the formation of fluoride glasses in place of oxide glasses. Thus, where a fluoride glass is desired such as $BeF_2$, $BaF_2$, $CaF_2$, AgBr and the like, the coating solution may be a halide sol-gel of appropriate stoichiometry and the core filament 11 may be silicon or a fluorocarbon such as Teflon. The reactive gases used for filament removal in stage 15 are then halide gases such as $F_2$, $Cl_2$, HCl and HF and others. When exposed to these gases in stage 15, the core filament 11 will volatilize, for example, as silicon tetrafluoride, leaving behind the fluoride glass precursor fiber. That precursor fiber would then be formed into an optical fluoride fiber.

Alternatively, if the filament core is $ZrF_4$, $AlF_3$, KCl etc., the filament 11 is converted into an integral part of the resulting optical glass fiber by chemical reaction.

In another embodiment of the invention, a graded index fiber can be formed in stage 15 where a core filament 11 of first index of refraction remains in place with an outer coating of a different index of refraction. The core in this example can be a refractory oxide such as $Al_2O_3$ or a non-oxide filament 11 such as a metal fluoride compound, wherein the core is not removed during the glass formation process.

The above process forms a step index type of fiber. A graded fiber can be formed within stage 15 if the coating formed in stage 13 is graded. Thus, if the content of the precursor coating is altered as the filament passes through stage 13, the coating can form a glass having an index of refraction which increases in a radial direction from the axis of the fiber. By way of example, the ratio of silica/germanium to sol-gel content can be varied as the filamentary core 11 advances through stage 13 so that the outer diameter layers have a continuously changing index of refraction in the final glass. Alternatively, a changing reaction of tetraethoxysilane to tetraethoxygermane (TEOS/TEOG) can be used along the length of stage 13 to produce the graded index of refraction in the subsequently formed glass fiber.

Figure 2D:
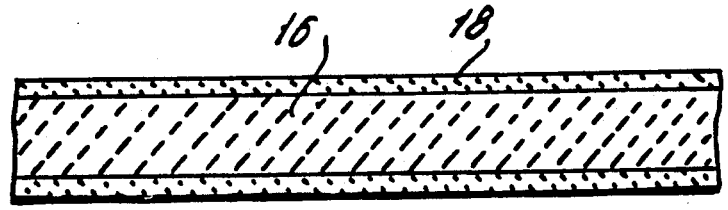

While graded index of refraction can be formed by control of the coating in stage 13, thicker fibers or graded index type fibers can be formed using added chemical vapor deposition (CVD) stages following stage 15. Stage 17 has input and output mercury seals or the like and has input and output connections for a suitable reaction gas. Thus, as shown in FIG. 1, a second chemical vapor deposition stage 17 is positioned to continually receive the partly formed optical fiber 16 from stage 15. Stage 17 can include further filament coating apparatus like that used in stage 13 and glass formation apparatus like that of stage 15 to convert the deposited coatings to a further glass shell 18 around the shell formed in stage 15, as shown in FIG. 2D. The new glass coating 18 may be identical to that formed in stage 15 where a thicker glass is desired or can have a different index of refraction and, indeed, a different composition, where a graded index of refraction is desired for the fiber. A plurality of such additional filament coatings and CVD stations can be provided at the output of stage 15.

After the full formation of the glass coating, the continuous filament moves into station 19 where the fiber is heated for final densification and diameter control, with the treated fiber 20 leaving station 19 as shown in FIG. 1 For example, station 19 can employ a plurality of lasers arranged around the fiber exiting from stage 15 or stage 17 if it is used, and heat the fiber for densification.

In another embodiment of the invention, the fiber can be densified under pressure which can be provided by molten metal alloys through which the filament is passed.

Figure 2E:
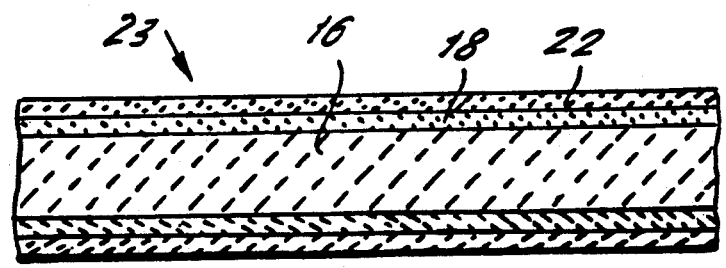
Figure 2F:
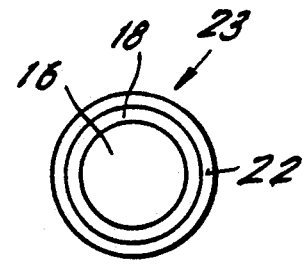

Thereafter the filament 20, which is now a finished optical fiber, enters stage 21 which is a chemical vapor deposition chamber or coating apparatus which applies a hermetically sealed protective coating 22, as shown in FIGS. 2E and 2F, to the fiber such as silicon nitride, amorphous carbon, titanium carbide diamond or diamond-like carbon or the like. Appropriate diamond film coated fibers may not require an additional organic protective coating since diamond coatings are inherently hard and scratch resistant.

Step 21 is also provided with suitable input and output seals and a gas inlet and outlet.

Figure 2G:
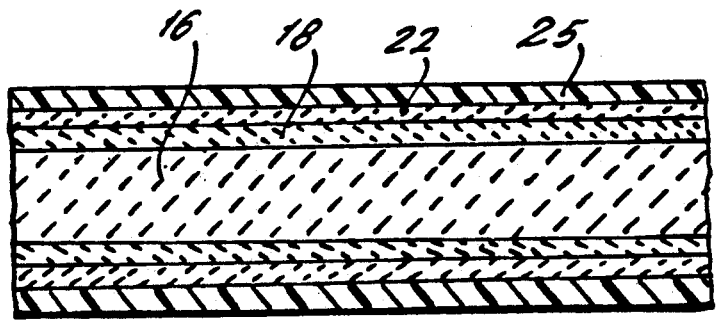

The coated fiber 23 next moves through stage 24 at which an organic coating 25 is applied to fiber as shown in FIG. 2G. The organic coating 25 may be a suitable plastic, silicone, epoxy teflon and the like.

Finally, the finished fiber, which has unlimited length, is reeled on a spool in the reel take-up stage 26.

The foregoing disclosure and drawings are merely illustrative of the principles of this invention and are not to be interpreted in a limiting sense. We wish it to be understood that we do not desire to be limited to the exact details of construction shown and described because obvious modifications will occur to a person skilled in the art.

What is claimed is:

1. A process for forming elongated optical glass fiber comprising the steps of:
   (a) providing an elongated core filament;
   (b) continuously coating said core filament along its length with at least one coating of optical fiber-forming material;
   (c) continuously chemically combining said at least one coating of optical fiber-forming material with said core filament to form an integrated optical fiber; and
   (d) continuously densifying said fiber along its length to a given diameter.

2. The process of claim 1 which further includes the formation of a plurality of sequential coatings of graded index of refraction materials on the exterior surface of said core filament.

3. The process of claim 1 wherein said at least one coating is formed on the outer surface of said core filament by chemical vapor deposition.

4. The process of claim 1 which further includes the step of continuously forming a protective coating on said densified fiber.

5. The process of claim 4 wherein the protective coating is selected from the group consisting of silicon dioxide, silicon nitride and diamond.

6. The process of claim 4 which further includes a concentric outer coating of organic material covering said protective coating.

7. The process of claim 1 wherein said integrated optical fiber is densified by the continuous application of laser or microwave energy to said integrated optical fiber as said integrated optical fiber passes a stationary densifying stage.

8. The process of claim 1 which includes the further step of continuously treating the surface of said core filament at a stationary treatment stage to prepare it to receive said at least one coating before said at least one coating is applied thereto.

9. The process of claim 8 in which the surface treatment of the surface of said core filament comprises a plasma-etching step.

10. The process of claim 1 wherein said coating is a material selected from the group consisting of tetraethoxysilane in toluene, colloidal silica solutions, hexamethyl siloxane, silicone, halide-containing solutions.

11. The process of claim 2 wherein said coating is a material selected from the group consisting of tetraethoxysilane in toluene, colloidal silica solutions, hexamethyl siloxane, silicone, and halide-containing solutions.

12. The process of claim 2 wherein said at least one coating is composed of a high silica content carbonaceous sol-gel solution.

13. A process for forming elongated optical glass fiber comprising the steps of:
   (a) providing an elongated core filament of volatilizable material;
   (b) coating said core filament along its length with at least one uniform thickness filament coating of optical fiber-forming material;
   (c) volatilizing said core filament to change the chemical state of said core filament so that the subsequently completely processed fiber will be capable of conduction of electromagnetic radiation along the length of said optical glass fiber;
   (d) converting said optical fiber-forming coating into an optical fiber; and
   (e) densifying said fiber along its length to a given diameter.

14. The process of claim 13, wherein said fiber continuously moves through spaced fixed process stations for respectively coating said core filament, volatilizing said core filament, converting said coating to said optical fiber and densifying said fiber.

15. The process of claim 13 which further includes the formation of a plurality of sequential coatings of graded index of refraction materials on the exterior surface of said core filament.

16. The process of claim 5 wherein said coating is formed on the outer surface of said core filament by chemical vapor deposition.

17. The process of claim 13 wherein said core filament is a volatilizable material selected from the group consisting of carbonaceous fiber, halide-containing fiber, and silicon fiber.

18. The process of claim 17 wherein said coating is a material selected from the group consisting of tetraethoxysilane in toluene, colloidal silica solutions, hexamethyl siloxane, silicone, halide-containing solutions.

19. The process of claim 13 wherein said step of volatilizing said core filament comprises the step of heating said core filament and said at least one coating in a hot oxidizing atmosphere whereby said filament is volatilized and removed, and whereby any carbonaceous content of said coating of optical fiber-forming material is removed.

20. The process of claim 13 wherein said core filament is volatilized by passing a high electrical current along at least selected portions of its length as said filament moves past fixed spaced electrodes.

21. The process of claim 13 wherein said core filament is oxidized by passing said filament through an electrical arc or a high energy microwave cavity.

22. The process of claim 13 wherein said core filament is a volatilizable material selected from the group consisting of carbon fiber, graphite fiber, fluorocarbon fiber, and silicon carbide fiber.

23. A process for forming elongated optical glass fiber comprising the steps of:
   (a) providing an elongated core filament, wherein the core filament is composed of refractory oxides;
   (b) continuously coating the core filament along its length with at least one coating of optical fiber-forming material;
   (c) continuously chemically combining said at least one coating of optical fiber-forming material with the core filament to form an integrated optical fiber; and
   (d) continuously densifying said integrated optical fiber along its length to a given diameter.

24. The process of claim 23 wherein the core filament is selected from the group consisting of alumina filament, zirconia filament, and tantalum pentoxide filament.

25. The process of claim 24 wherein the core filament is treated with hot halide gases and solutions.

26. The process of claim 24 wherein said at least one coating is a sol-gel solution and said at least one coating is chemically combined with the core filament via a heat treatment method.

27. A process for forming elongated optical glass fiber comprising the steps of:

(a) providing an elongated core filament, wherein the core filament is composed of halide containing material;

(b) continuously coating the core filament along its length with at least one coating of optical fiber-fiber material;

(c) continuously chemically combining said at least one coating of optical fiber-forming material with said core filament to form an integrated optical fiber; and (d) continuously densifying said fiber along its length to a given diameter.

28. The process of claim 27 wherein the core filament is selected from the group consisting of $ZrF_4$, $AlF_3$, KCl, and fluorocarbons.

29. The process of claim 28 wherein the core filament is treated with steam and heated hydrogen gas.

30. The process of claim 27 wherein said at least one coating is a halide sol-gel solution and said at least one coating is chemically combined with the core filament via a heat treatment method.

* * * * *